(12) United States Patent
Parraga McNairn

(10) Patent No.: US 7,996,094 B2
(45) Date of Patent: Aug. 9, 2011

(54) USAGE OF A VIRTUAL UNIT

(75) Inventor: John Robert Parraga McNairn, Anthem, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 262 days.

(21) Appl. No.: 12/207,044

(22) Filed: Sep. 9, 2008

(65) Prior Publication Data

US 2010/0063793 A1  Mar. 11, 2010

(51) Int. Cl.
*G05B 11/01* (2006.01)
(52) U.S. Cl. .............................. 700/4; 700/20
(58) Field of Classification Search .................. 700/2, 3, 700/4, 20

See application file for complete search history.

(56) References Cited

U.S. PATENT DOCUMENTS

| 6,049,853 A * | 4/2000 | Kingsbury et al. ............ 711/147 |
| 6,314,453 B1 * | 11/2001 | Hao et al. ....................... 709/205 |
| 6,850,953 B1 * | 2/2005 | Deshpande et al. ................... 1/1 |
| 2003/0036809 A1 * | 2/2003 | Landman et al. .................. 700/4 |
| 2005/0251785 A1 * | 11/2005 | Vertes et al. ................... 717/105 |

* cited by examiner

*Primary Examiner* — Ryan A Jarrett
(74) *Attorney, Agent, or Firm* — Turocy & Watson LLP; William R. Walbrun; John M. Miller

(57) ABSTRACT

Problems can occur when a controller is limited in ownership to one process. To minimize these problems, phantom Units can be used that are direct replicas of actual Units. Thus, multiple processes can own a single controller—one process can own the actual Unit while another process owns the virtual controller. At an appropriate time, such as when the actual Unit is no longer owned, bindings with the phantom Unit can transfer to the actual Unit.

18 Claims, 10 Drawing Sheets

USAGE OF A VIRTUAL UNIT

TECHNICAL FIELD

The subject specification relates generally to an industrial control configuration and in particular to using a phantom state machine in operation with the configuration.

BACKGROUND

Industrial control environments can typically involve complex mechanical, electronic, electro-mechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

A number of controllers as well as units can integrate with one another to complete a number of different processes. In conventional industrial control configurations, a controller (e.g., batch controller) is used to facilitate operation of a process. In this setting, only one process commonly can own a Unit at a given time. Limited ownership allows only one process to create bindings with a Unit, use resources of the controller, and the like.

With the disclosed innovation, a phantom Unit can be created in addition to an actual Unit, where the phantom Unit and actual Unit share functionality. While a first process is using the actual Unit, a second process can engage with the phantom Unit, thus allowing for multiple processes to have ownership of a piece of equipment represented by the actual Unit as well as the phantom Unit type. When the first process is finished using the actual Unit, then the second process can move to the actual Unit and carry along relevant bindings and the like.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
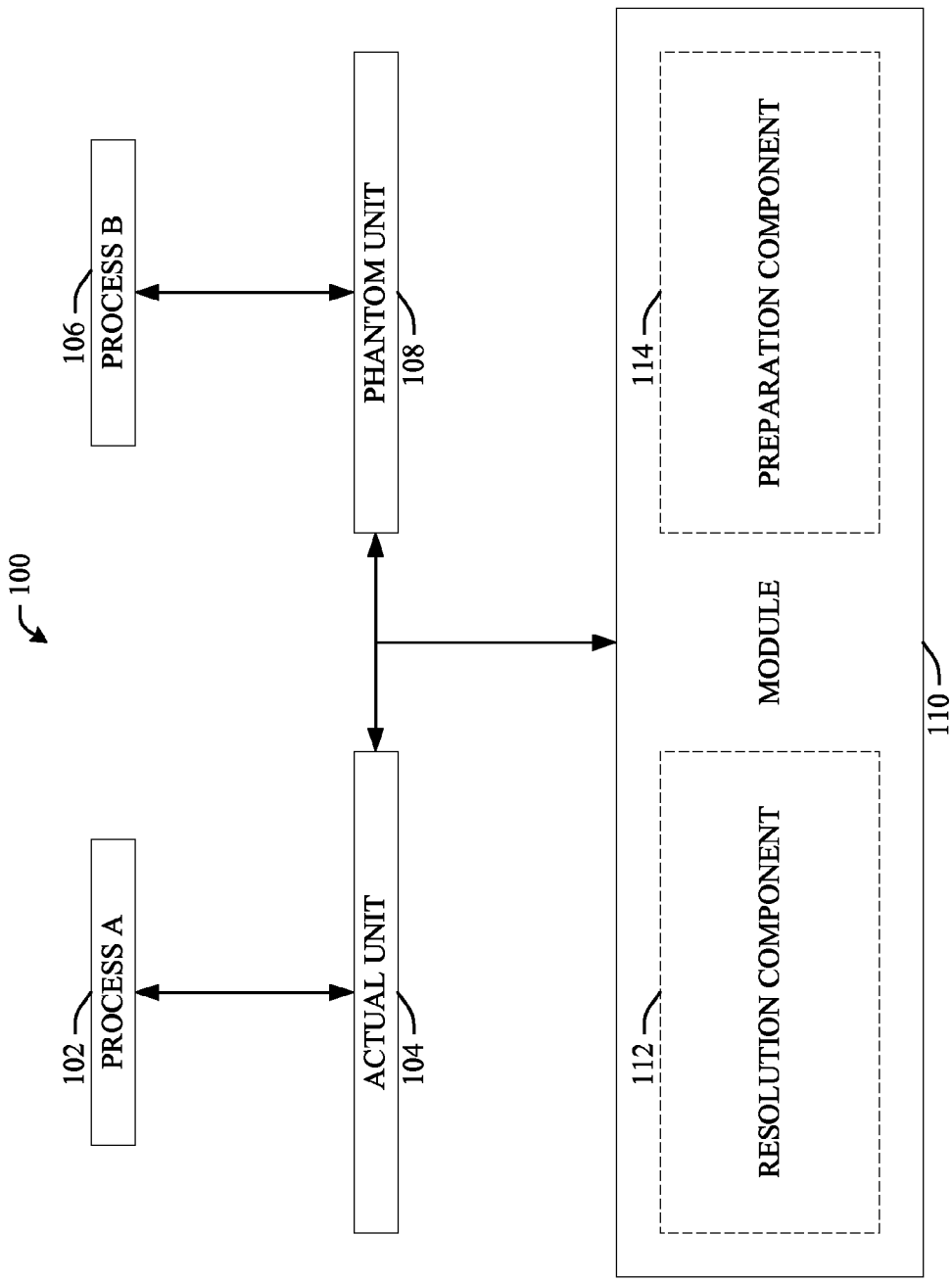
FIG. 1 illustrates a representative system for using a phantom unit to improve efficiency in an industrial control configuration in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component.

One or more components can reside within a process and/or thread of execution and a component can be localized on one computer and/or distributed between two or more computers. As another example, an interface can include I/O components as well as associated processor, application, and/or API components.

Now referring to FIG. 1, an example system 100 is disclosed for using a shadow unit in an industrial control configuration. In an industrial control configuration, a number of controllers can integrate together to facilitate completion of processes (e.g., implemented through a recipe). However, in conventional operation a controller can be owned by a process and other processes cannot use the controller while it is owned. To alleviate this problem, phantom units can be used that carry similar or identical functionality to that of an actual unit, thus allowing multiple processes to function simultaneously.

Process A 102 can own an actual Unit 104—however, process B 106 can desire to also use the actual Unit 104. Since the actual Unit 104 is not available due to the ownership of process A 102, a phantom Unit 108 can be used to improve efficiency. Process B 106 can operate upon the phantom Unit 108 such that bindings can occur, physical movement of equipment can take place, and the like.

A device 110 can become part of the industrial control configuration to provide functionality related to the phantom Unit 108. The device 110 can employ a resolution component 112 that determines if a phantom entity (e.g., phantom Unit 108) should be used for a supplemental process (e.g., process B 106). According to one embodiment, a determination is made if process B 106 desires to use the actual Unit 104 and another process owns the actual Unit 104. If both the aforementioned determinations have a positive result, then the resolution component 112 can determine that a phantom entity should be used. However, more complex implementations can be practiced—for example, while use of the phantom entity can be beneficial, it can consume valuable resources (e.g., computer memory) and the resolution component 112 can balance these competing interests such that a phantom entity should not be used even if two processes are requesting one controller.

Upon determining a phantom entity should be used, a preparation component 114 can perform an action for the supplemental process (e.g., process B) upon the phantom entity. The phantom entity (e.g., phantom Unit 108) can be a replication of a primary entity (e.g., actual Unit 104) and performance of the action can occur while the primary entity engages a principal process (e.g., process A 102). Example actions can include creation of a binding, access of a resource, physical movement of an object, etc. It is to be appreciated that more than one phantom entity can be used simultaneously and be engaged by different processes.

The following is an illustrative instance relating to use of the system 100 as well as other aspects disclosed herein. In a manufacturing plant, a strong abrasive acid can be used on materials where timing is of critical importance—if exposed too long to acid, the material could become irreparably damaged. The plant can have various controllers that control mechanical arms (e.g., cranes) and an arm can be predicatively positioned to remove the material even if a controller relating to the arm is used in another process (e.g., managing another acid burn action).

Figure 2:
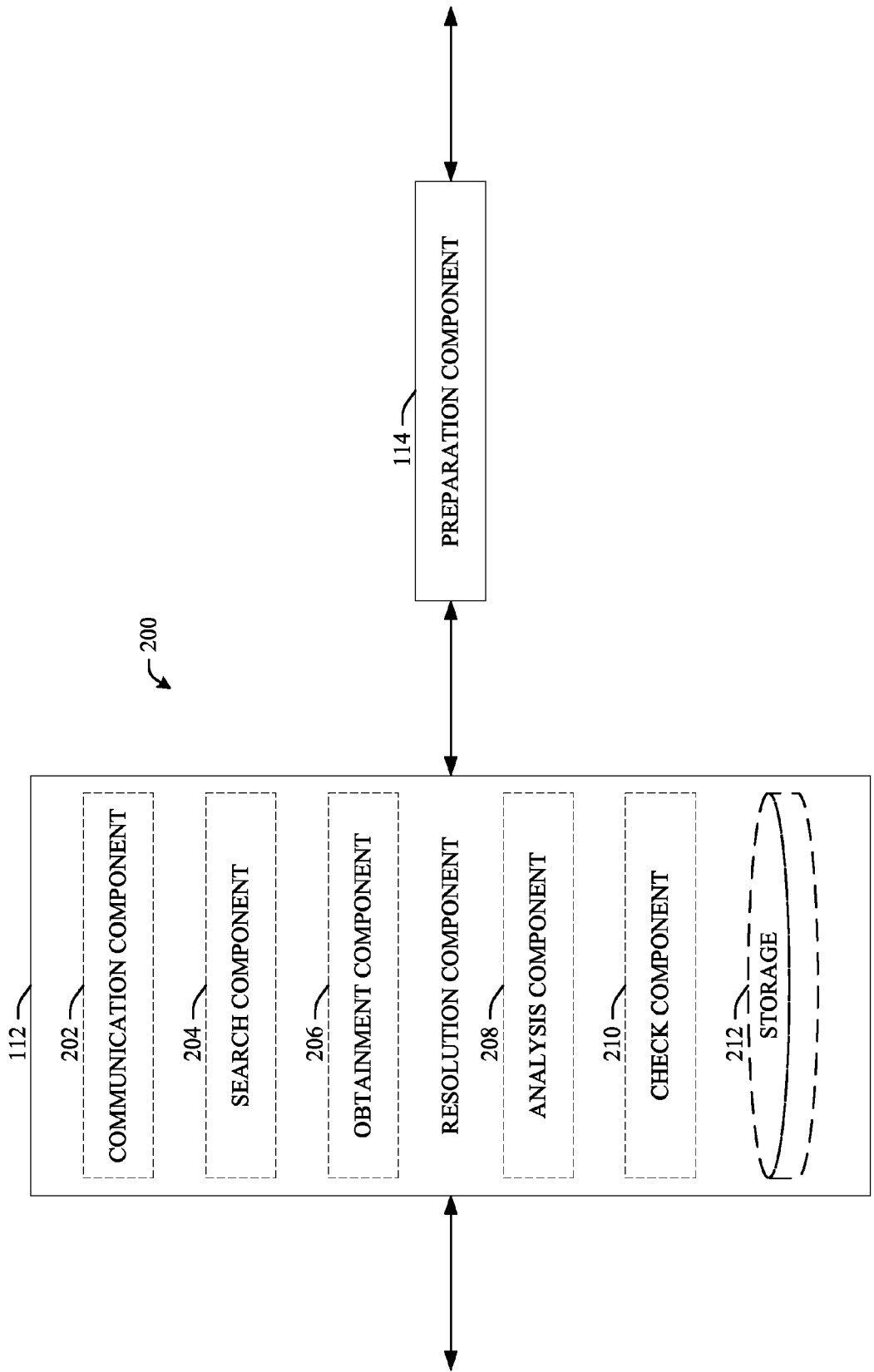
FIG. 2 illustrates a representative system for using a phantom unit to improve efficiency in an industrial control configuration with a detailed resolution component in accordance with an aspect of the subject specification.

Now referring to FIG. 2, an example system 200 is disclosed for using a phantom unit in an industrial control configuration with a detailed resolution component 112. The resolution component 112 can determine if a phantom entity should be used for a supplemental process. This can occur prior to creation of a phantom entity, after there is creation of a phantom entity, etc.

To facilitate operation, the resolution component 112 can use a communication component 202 that can engage with other devices to transfer information, such as to send a request for metadata, receiving metadata from an auxiliary source, etc. Operation can take place wirelessly or in a hard-wired manner, can employ security technology (e.g., encryption), etc. Additionally, metadata transfer can be active (e.g., query/response) or passive (e.g., monitoring of public communication signals). Moreover, the communication component 202 can use various protective features, such as performing a virus scan on collected metadata and blocking metadata that is positive for a virus.

A search component 204 can discover information sources that are part of the configuration as well as auxiliary sources. For instance, the search component 204 can discover active processes in the configuration since an active configuration is likely to have ownership of a controller. In addition, the search component 204 can evaluate potential information sources to deem if they include relevant information and/or are likely to hold relevant information.

Locations deemed relevant by the search component 204 as well as other locations can have information accessed by an obtainment component 206. The obtainment component 206 can gather information (e.g., access information) from various locations, including collecting an instruction for a process to use a controller, determining if a controller to be used in a process is owned by another process, and the like. Filtering can be practiced, such that only information likely to be relevant is collected, information from more reliable sources is gathered first, a limited amount of data (e.g., based upon storage size) is collected, as well as other filtering types.

An analysis component 208 can evaluate at least a portion of the industrial control configuration (e.g., through obtained metadata), and a result of the evaluation is used by the resolution component 112 in making the determination. It is possible that a supplemental process is using an actual Unit that is appropriate for use by a principal process. While a phantom entity could be created and used, there can be situations where this is undesirable. For instance, the supplemental process could be near completion or the principal process can be relatively unimportant. Therefore, while a phantom unit could be used, it can be considered a waste of resources based upon a result of evaluation of the analysis component 208.

In addition, it is possible that a process requires using an actual Unit. For example, use of a virtual entity can cause an operational error, cause performance at a slower rate, and the like. Therefore, a check component 210 can be used to determine if there is likely to be a problem with using a phantom entity. In addition, the process can be hard-coded such that a phantom entity should not be used, which can be appreciated by the check component 210.

Different pieces of information, such as collected metadata, component operating instructions (e.g., communication component 202), source location, components themselves, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a RAID configuration). In addition, storage 212 can operate as memory that can be operatively coupled to a processor (not shown) and can implement as a different memory form than an operational memory form. Moreover, there can be a computer program embodied upon the storage 212 (e.g., a computer-readable medium) comprising program code for accessing a phantom Unit based upon an actual Unit and program code for modeling of at least one rule or at least one relationship among resources based on representing states of use for the phantom Unit and actual Unit. The system 200 can also include a preparation component 114 that performs an action for the supplemental process upon the phantom entity. The phantom entity is a replication of a primary entity and performance of the action occurs while the primary entity engages a principal process.

Figure 3:
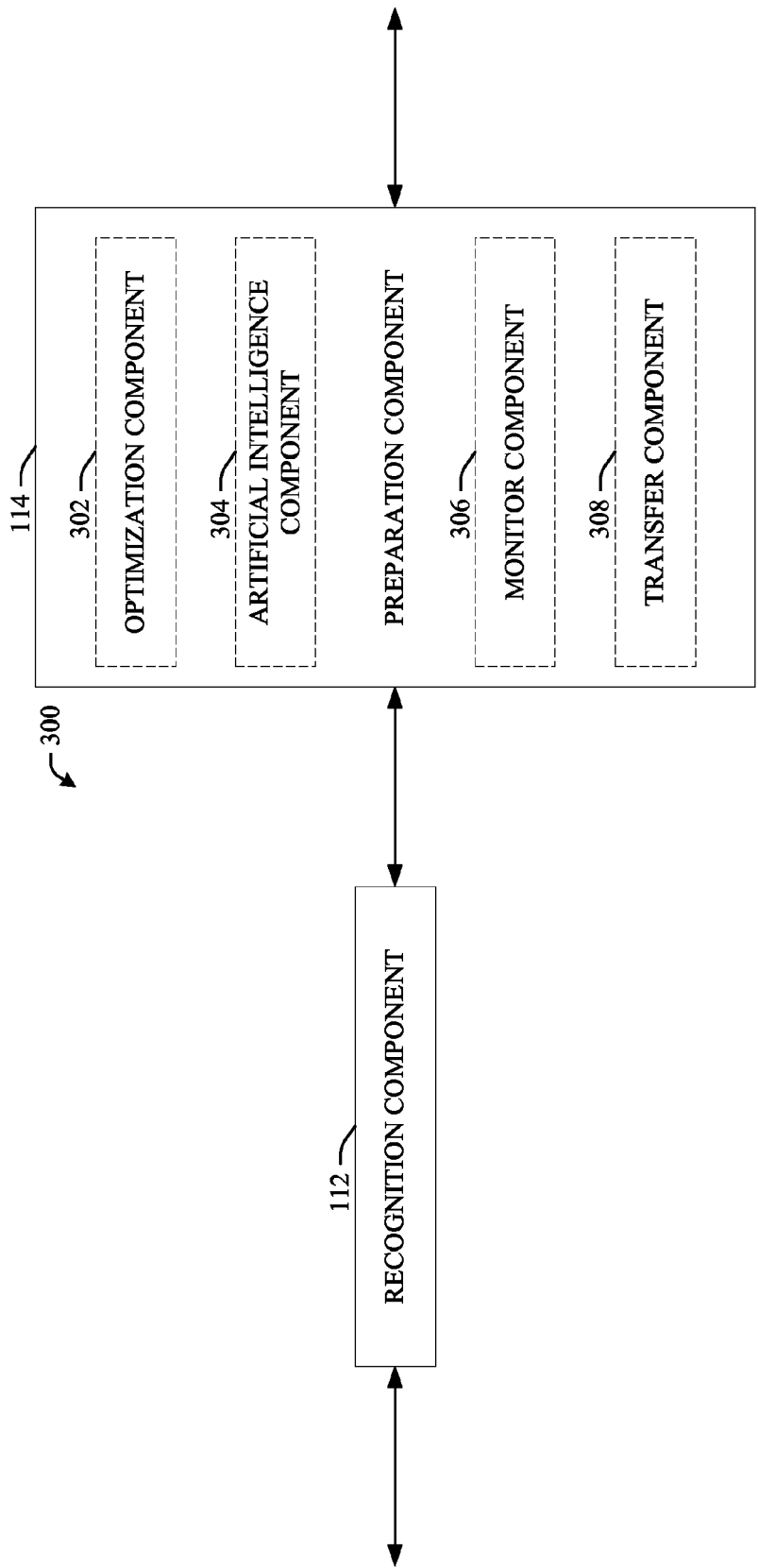
FIG. 3 illustrates a representative system for using a phantom unit to improve efficiency in an industrial control configuration with a detailed preparation component in accordance with an aspect of the subject specification.

Now referring to FIG. 3, an example system 300 is disclosed for using a phantom unit in an industrial control configuration with a detailed preparation component 114. A resolution component 112 can determine if a phantom entity should be used for a supplemental process. If the resolution component 112 determines the phantom entity should be used, then a preparation component 114 can perform an action for the supplemental process upon the phantom entity. The phantom entity is a replication of a primary entity and performance of the action occurs while the primary entity engages a principal process.

With a determination that a phantom unit should be used, an optimization component 302 can operate such that operation is performed in an efficient manner. For example, the optimization component 302 can determine when the action should occur, what resources to use with the action, and the like. In addition, the optimization component 302 can operate based upon previous uses of a phantom entity—thus predictive models can be used to train operation.

An artificial intelligence component 304 can be used to facilitate determinations of the system 300. It is to be appreciated that artificial intelligence techniques can be used to practice determinations and inferences disclosed in the subject specification. The artificial intelligence component 304 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 304 can also include methods for capture of logical relationships such as theorem provers or more heuristic rule-based expert systems. The artificial intelligence component 304 can be represented as an externally pluggable component, in some cases designed by a disparate (third) party.

While many operations can be performed upon the phantom entity, it can be beneficial and/or necessary for a process to eventually engage the actual entity. Therefore, a monitor component 306 can observe the actual entity to determine when the ownership is free and thus when transfer from the phantom entity to the actual entity should occur. In addition, the monitor component 306 can observe a process to determine when ownership is to be relinquished. According to one embodiment, the determination of the monitor component 306 is based upon completion of principal process that engages the primary entity.

A transfer component 308 can use a result of the action performed upon the phantom entity upon the primary entity. For example, if a binding is created with the phantom entity and a mechanical object, the mechanical object can bind with the actual entity. Thus, the monitor component 306 can determine when the transfer component 308 should operate.

Figure 4:
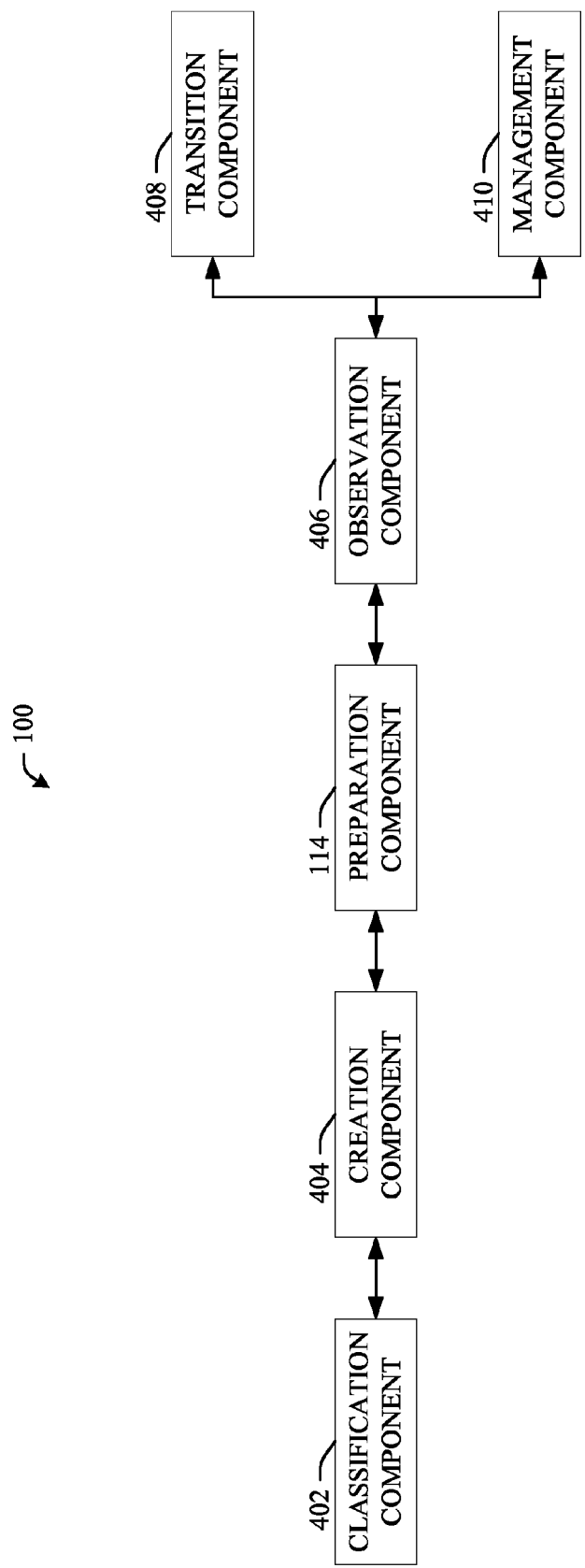
FIG. 4 illustrates a representative system for virtual state machine creation in an industrial control configuration in accordance with an aspect of the subject specification.

Now referring to FIG. 4, an example system 400 is disclosed for creation of a shadow entity regarding operation of an industrial control configuration. A determination can be made by a classification component 402 on when to create a phantom entity. For example, the classification component 402 can determine that multiple processes are scheduled to use an entity and thus multiple entities should exist. The classification component 402 can operate as means for determining when to create the virtual entity.

A creation component 404 can generate the shadow entity based upon an actual entity. The shadow entity can be virtually an exact replication of the actual entity as well as be a limited version tailored to an applicable process. The creation component 404 can work in conjunction with the resolution component 112 of FIG. 1. For example, the resolution component 112 can determine a shadow entity should be used and transfer a notice to the classification component 402. The classification component 402 can determine when creation is appropriate and the creation component can generate the shadow entity. The creation component 404 can function as means for creating a virtual entity based upon an actual entity.

A preparation component 114 can engage the shadow unit as if it were the actual unit. According to one embodiment, the preparation component 114 can test the shadow entity to ensure that the shadow entity is an adequate representation. If the shadow entity is not an adequate representation, then the creation component 404 can perform appropriate modification. The preparation component 114 can implement as means for performing an action for a supplemental process upon the virtual entity, the virtual entity is a replication of the actual entity and performance of the action occurs while the primary entity engages a principal process.

It can be beneficial for operations upon the shadow entity to move to the actual entity when available—an observation component 406 can determine when transition should occur. Functionality of the monitor component 306 of FIG. 3 can be used by the observation component 406. The observation component 406 can function as means for determining when to transition from the virtual entity to the actual entity.

A transition component 408 can seamlessly move the process from the shadow entity to the actual entity. The system 400 can operate such that the process is unaware if it is using an actual entity or shadow entity. Functionality of the transfer component 308 of FIG. 3 can be used by the transition component 408. The transition component 408 can operate as means for transitioning from the virtual entity to the actual entity based upon the determination.

It can consume a relatively large number of resources to use a shadow entity and there can be benefit in deleting the shadow entity when no longer beneficial. The management component 410 can determine when to delete the shadow entity (e.g., when the shadow entity is no longer used). The management component 410 can function as means for deleting the virtual entity upon completion of the transitioning from the virtual entity to the actual entity.

In addition, the management component 410 can function as an industrial control configuration administer. For example, there can be multiple shadow units replicating an actual unit, where each shadow unit is owned by a different process. When the actual unit is complete (e.g., a primary process relinquishes ownership), there can be multiple processes desiring to transfer to the actual unit. The management component 410 can evaluate the different processes and shadow entities and determine which process should move to the actual entity. The determination can be based upon time (e.g., which process is the closest to actual implementation), resources (e.g., transfer a process that consumes the most resources so it completes quicker), stability (e.g., transfer from a least stable shadow entity), etc. In addition, the industrial control configuration can have a limit on phantom entities (e.g., based on consumed resources). The management component 410 can determine what shadow entities should be created if there are requests to create more than an allotted number.

Figure 5:
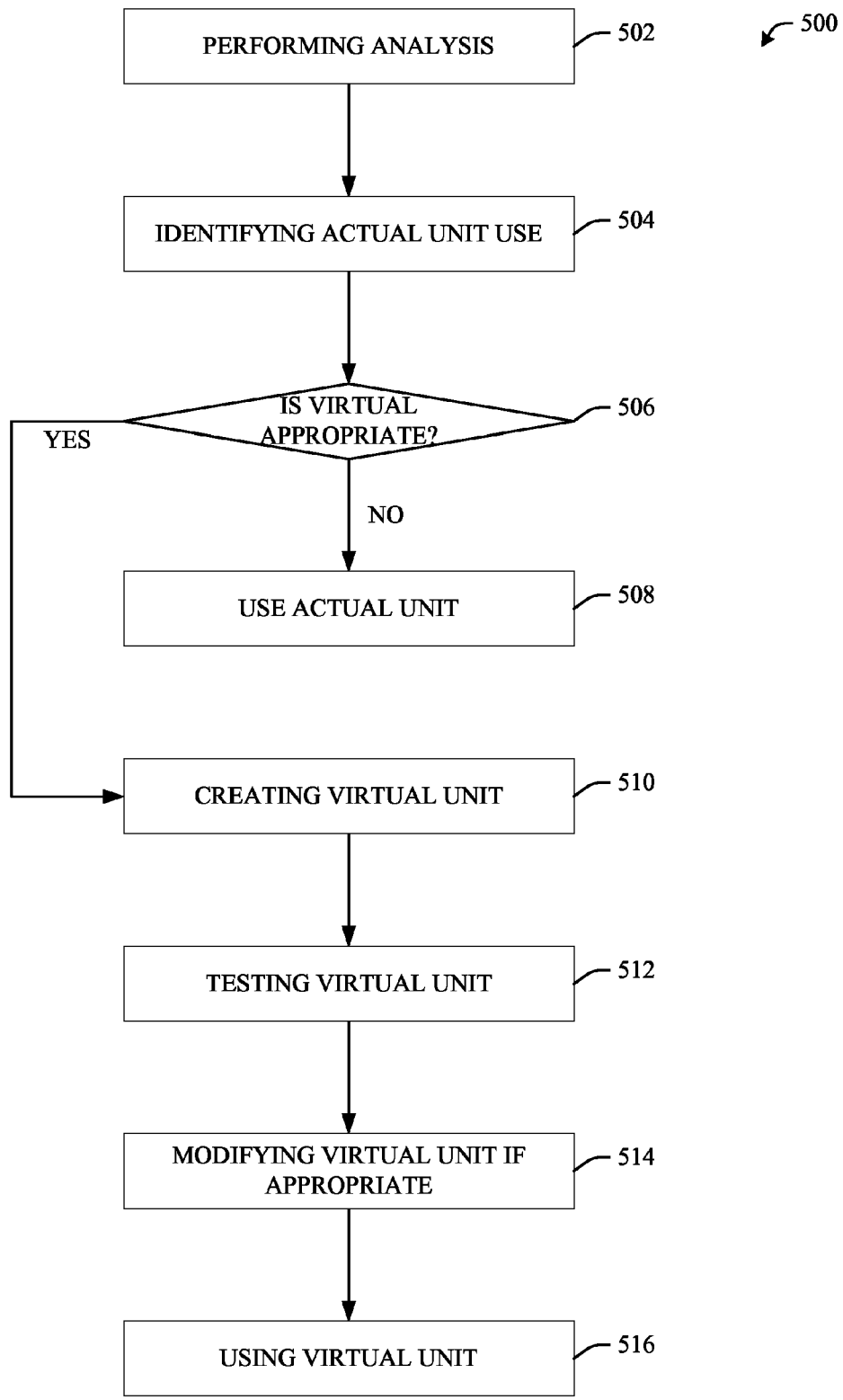
FIG. 5 illustrates a representative methodology for creating a phantom unit regarding an industrial control configuration in accordance with an aspect of the subject specification.

Now referring to FIG. 5, an example methodology 500 is disclosed for using a phantom unit in conjunction with an industrial control configuration. At event 502, there can be analysis of the configuration. Commonly analysis can include determining processes used in the configuration, determining available resources, and the like. Based upon a result of the analysis, there can be an identification of usage of an actual unit at act 504. For example, an inquiry can be made to the actual unit if the actual unit is owned by a process. Upon a determination that there is ownership, a request can be made to the process that owns the actual unit to relinquish control and/or when control is anticipated to be relinquished.

A check 506 can be performed on if there is an appropriate instance to use a virtual unit. For example, if a process requires the actual unit, the actual entity is not owned, it would be a waste of resources to use a virtual unit, etc., then it can be determined that virtual unit usage is inappropriate. Therefore, the actual unit can be used at event 508. The check 506 can operate as determining that use of a phantom unit is appropriate. In addition, act 504 can represent identifying if the actual unit is in use, and if the actual unit is not in use then it is determined that use of the phantom unit is not appropriate. However, if the check 506 determines that it is appropriate to use a virtual unit, then the virtual unit can be created at action 510, thus representing creating the phantom unit based upon an actual unit. In practice, the phantom Unit can be a phantom controller and the actual Unit can be an actual controller. According to one embodiment, the actual unit can be evaluated in order to appreciate characteristics and software can be used to replicate the actual unit, thus being the virtual unit. A process can function as if the virtual unit is an actual unit as well as appreciate that status of the virtual unit as not being the actual unit.

The created virtual unit can be tested at event 512 to ensure that the virtual unit is an adequate representation of the actual unit. Event 512 can represent testing the phantom unit to determine if the phantom unit adequately represents the actual unit. If appropriate, the virtual unit can be modified if it is determined that the virtual unit is not an adequate representation at act 514. Act 514 can implement as modifying the phantom unit if it is determined there is not adequate representation. While absolute representation can be practiced, it is to be appreciated that the virtual unit can have deviation (e.g., slight deviation) from the actual unit. For example, processing speeds can be less in a virtual unit than an actual unit. With an adequate virtual unit, a process can take ownership of the virtual unit and perform similar functionality as the process would with the actual unit at event 516.

Figure 6:
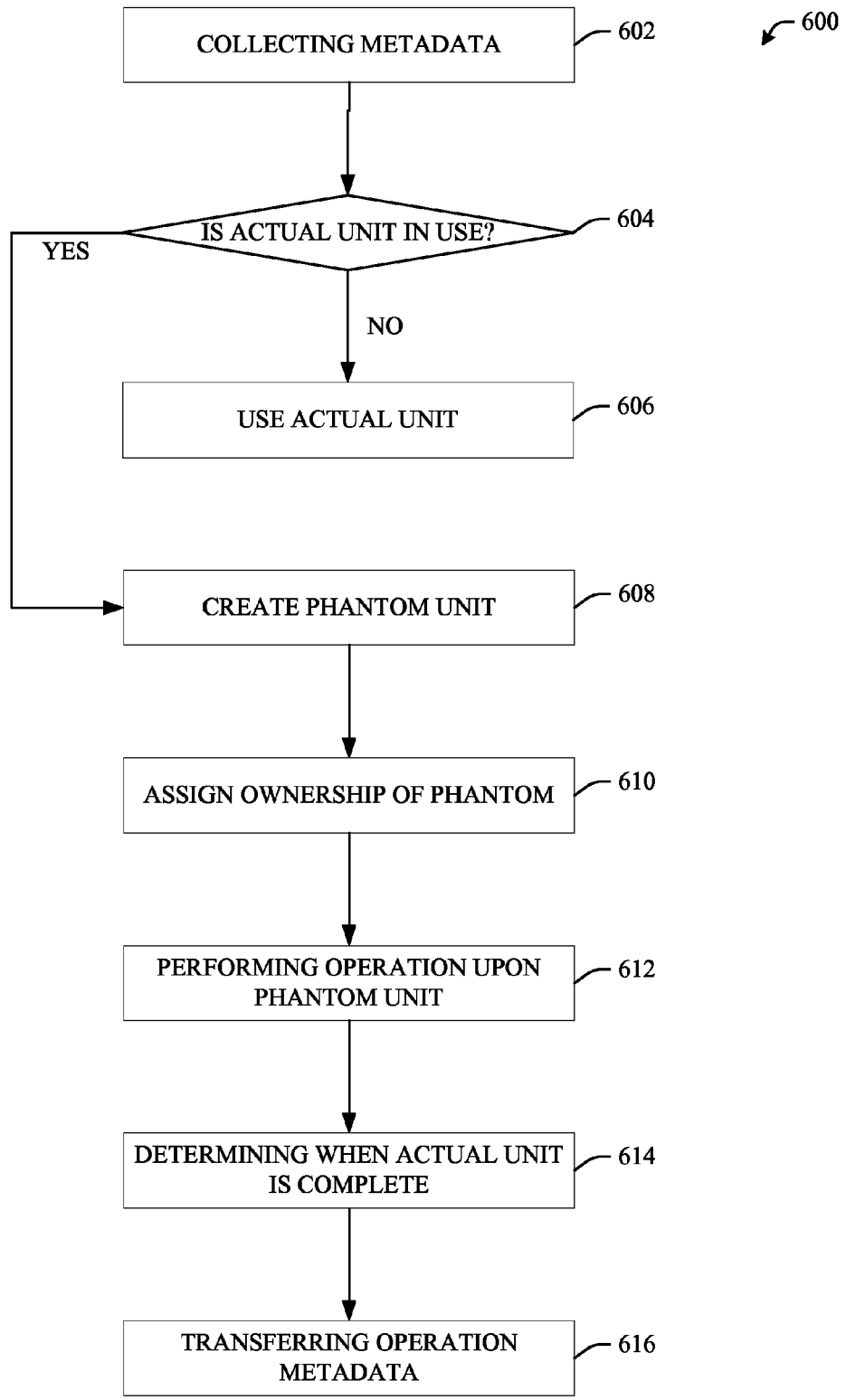
FIG. 6 illustrates a representative methodology for managing use of virtual unit and actual unit for an industrial control configuration in accordance with an aspect of the subject specification.

Now referring to FIG. 6, an example methodology 600 is disclosed for managing operation of a phantom unit in an industrial control configuration. An instruction for a process to run upon the configuration can be collected at act 602. Based upon the instruction, selective metadata can be obtained that pertains to the configuration. For example, the process can be analyzed and relevant controllers can be identified and evaluated (e.g., determining if an actual Unit is used by another process and if ownership is exclusive).

A check 604 can be performed to determine if an actual unit is in use (e.g., a process owns the unit). If it is determined that the actual unit is not in use, then a designated process (e.g., signified in the instruction) can use the actual unit at act 606. However, if the actual unit is in use, then a phantom unit can be created at event 608. According to one embodiment, the actual unit can be evaluated and the phantom unit is created as a function of a result of the evaluation. While the phantom unit is disclosed as being created on a need basis (e.g., upon determining that multiple processes desire to own one actual unit simultaneously), it is to be appreciated that phantom units can be pre-configured prior to a need for the unit arising.

Ownership to the phantom unit can be assigned through action 610, commonly to the designated process. Operations can be performed upon the phantom unit at event 612. These operations can include procedures that would be performed upon the actual unit had the designated process been able to establish ownership. In one implementation, a phantom unit can represent multiple entities. For example, a process can desire to use multiple actual units simultaneously where both units are already owned. A phantom unit can be created and used that represents at least two of the multiple actual units.

The actual unit can be monitored and a determination can be made for when the actual unit is complete at event 614. This can include observing operation of a process and/or the actual unit (e.g., inactivity signifies ownership is complete) as well as learning information published in a configuration directory (e.g., a distributed directory). However, a more active engagement can take place, where the actual unit and phantom unit are in direct communication and the actual unit notifies the phantom unit when it becomes free from ownership.

Upon the actual unit becoming free of ownership, the process can transfer from the phantom unit to the action unit at event 616. While transfer of all information can take place, selective transfer can also occur. For example, a process can include a portion where a crane arm moves. If the crane arm movement is complete while the process owns the phantom unit, then it can be a waste of resource to transfer related metadata and therefore this transfer does not occur.

Figure 7:
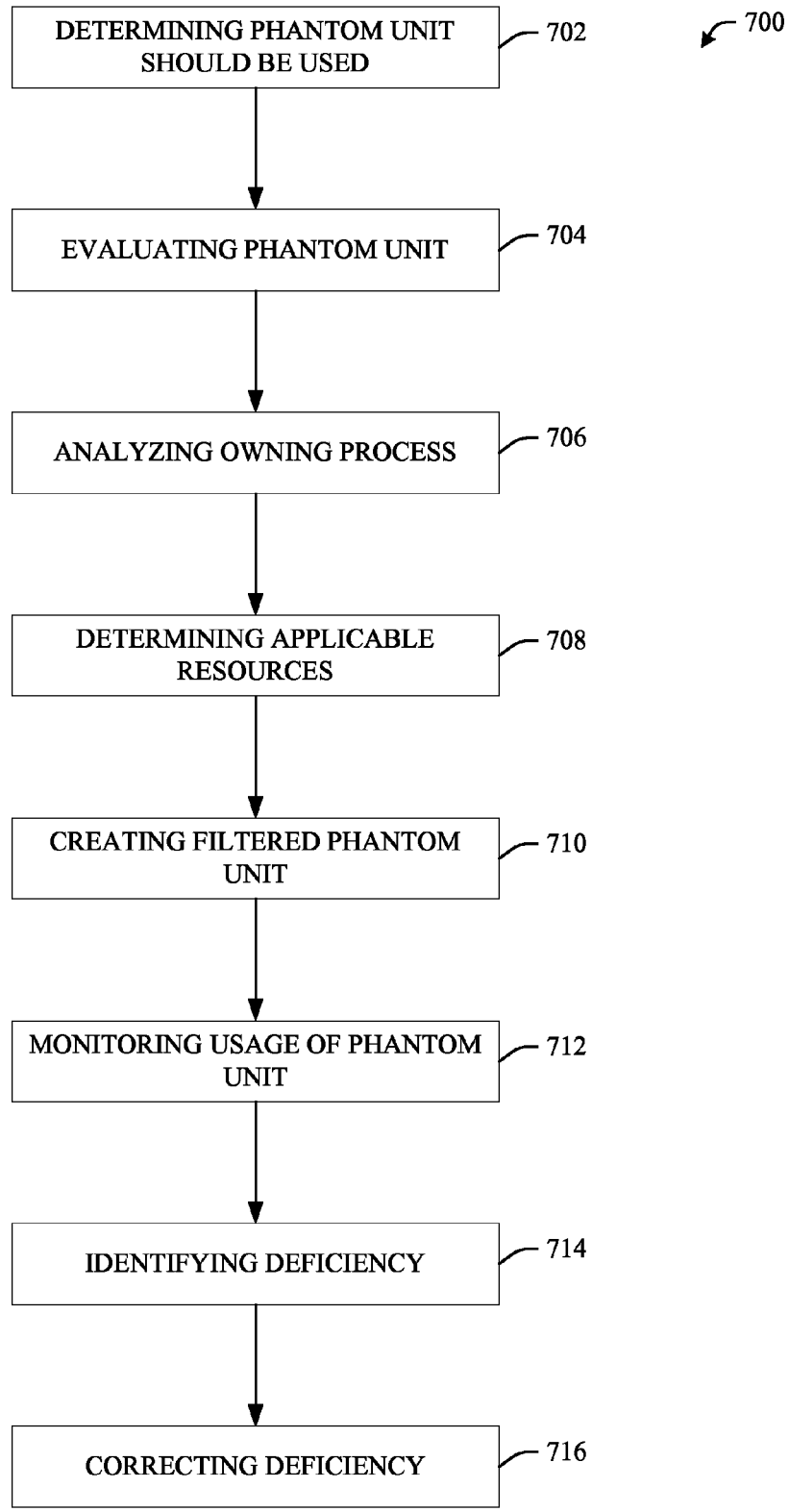
FIG. 7 illustrates a representative methodology for using a scaled-down phantom unit for an industrial control configuration in accordance with an aspect of the subject specification.

Now referring to FIG. 7, an example methodology 700 is disclosed for managing a phantom unit in an industrial control configuration. A determination can be performed at event 702 on if a phantom unit should be used. If the phantom unit is to be used, then the phantom unit can be evaluated at action 704 and a process that anticipates taking ownership of the phantom unit can be analyzed at event 706. A comparison can be made among the phantom unit and the process to determine resources of the phantom unit that are likely to be of a relatively high importance to the process (e.g., applicable resources for when the process uses the phantom entity) at act 708.

Based upon the determined applicable resources, a filtered phantom unit can be created at action 710. It can be cumbersome to create an exact replica to an actual unit, so a limited version can be created specifically tailored to a process. For example, detailed database information can be excluded from the replication to make the system more efficient. As the process uses the phantom unit, monitoring of the operation can occur at act 712. Since the phantom unit is created in anticipation of process operation, it is possible that the phantom unit is insufficient (e.g., does not include a resource desired by the process). Therefore, there can be identifying a deficiency of the phantom unit 714, determining how the deficiency should be corrected, and correcting the deficiency at event 716.

Figure 8:
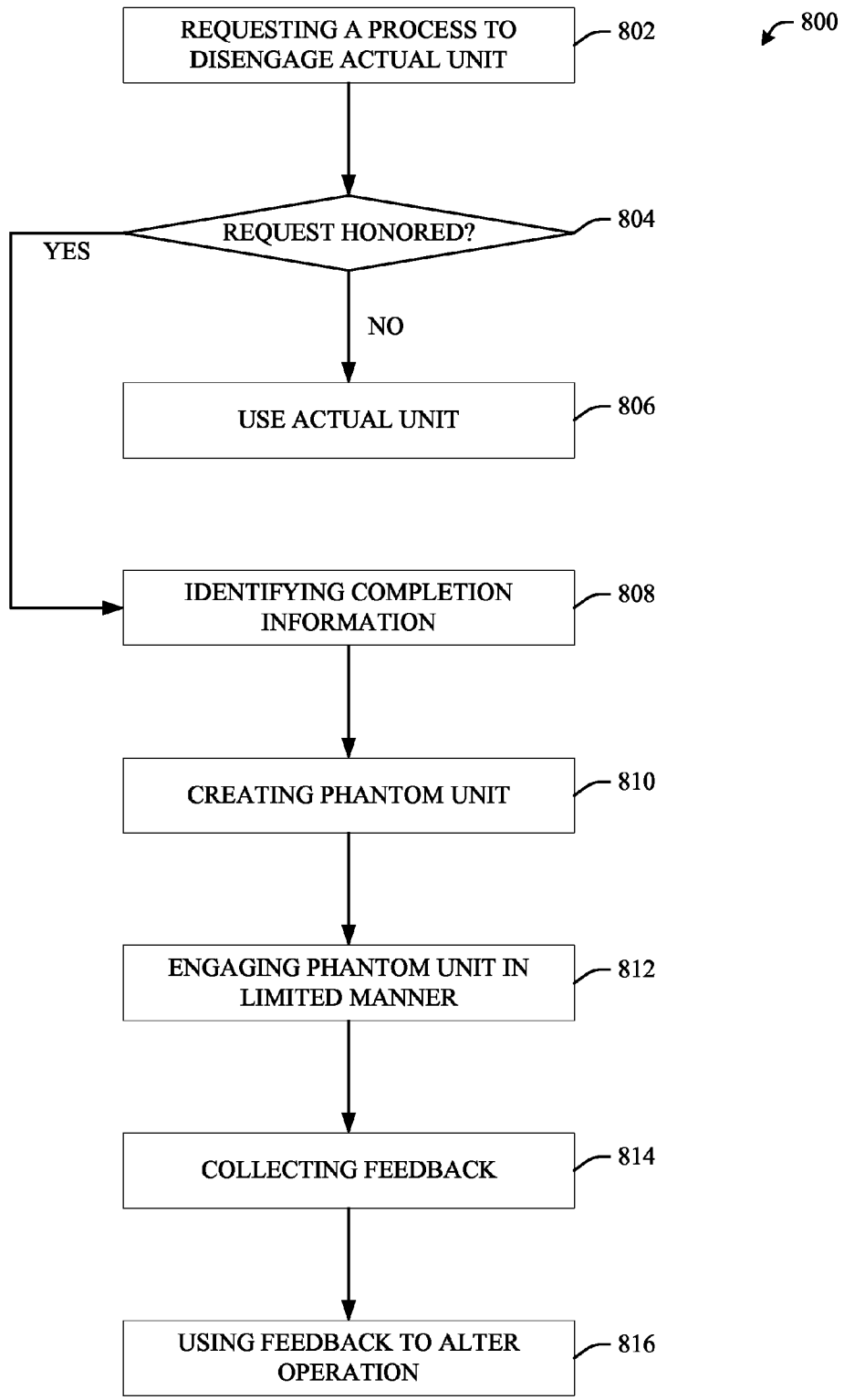
FIG. 8 illustrates a representative methodology for engaging a process using an actual unit in an industrial control configuration in accordance with an aspect of the subject specification.

Now referring to FIG. 8, an example methodology 800 is disclosed for training operation regarding a phantom unit. While a determination can be made if a phantom unit is being used, it is also possible that processes of a system coordinate with one another. A request can be made to a process owning an actual unit if the process would be willing to relinquish ownership at event 802. A check 804 can take place determining if the request is honored. If the request is honored, then the actual unit can be used by the process at action 806. For instance, a non-critical process (e.g., physical cleaning) can own an actual unit and a request can be made by a critical process (e.g., failure correction) to use the actual unit. The non-critical process can request creation of a phantom unit and transfer operation to the phantom unit since it is less important then the critical process. According to an alternative embodiment, a central management system can be employed to instruct a process to move from an actual unit to a phantom unit.

If it is determined that the request is not honored, then features of the actual unit that are anticipated to benefit the process can be identified at act 808. Based upon the identified resources, a phantom unit can be constructed at action 810 and can be engaged in a limited manner (e.g., in accordance with the phantom unit capabilities) at event 812. Feedback related to the created phantom unit can be collected at act 814, which can include observations made as well as direct information from an engaging process. For example, information can be provided that relates to speed, features provided, stability, and the like. Based upon this information, operation for creating the phantom unit can be changed at action 816. For example, if information is provided that phantom units commonly do not include an adequate number of resources, then operation can be changed such that more resources are provided with phantom units.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
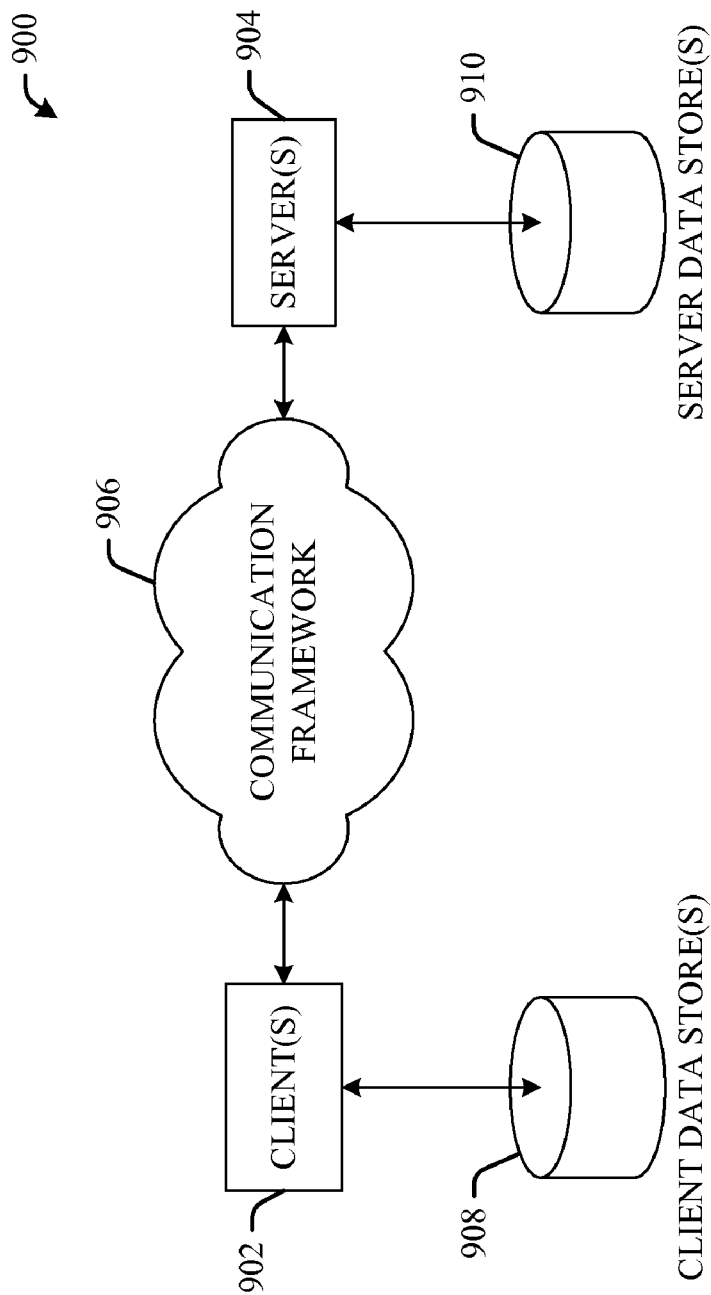
FIG. 9 illustrates an example of a schematic block diagram of a computing environment in accordance with an aspect subject specification.
Figure 10:
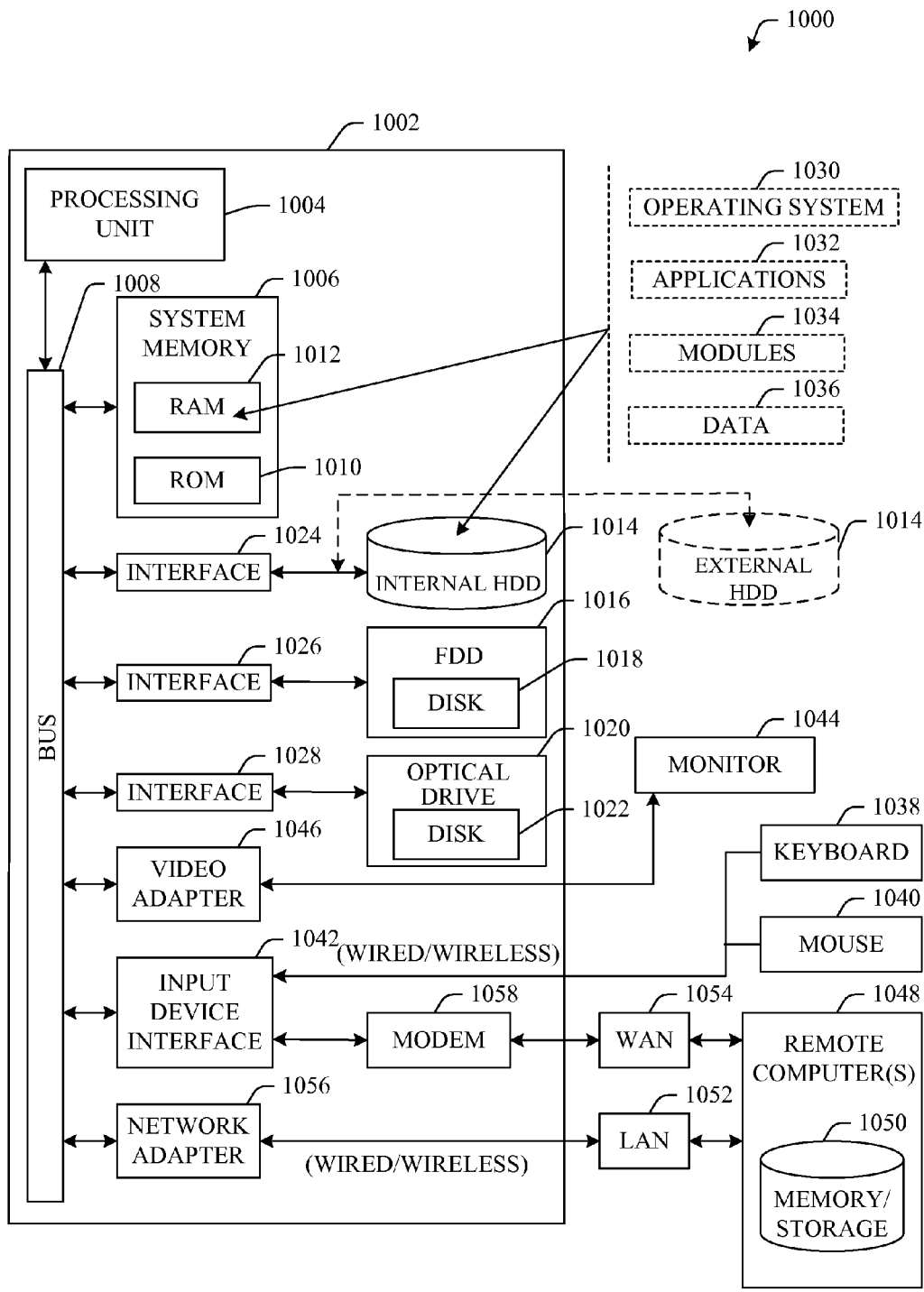
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types.

Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system stored on a non-transitory computer-readable storage medium and capable of implementation upon an industrial control configuration, comprising:

a resolution component configured to determine that a phantom entity is to be used for a supplemental process;

a preparation component configured to an action for the supplemental process upon the phantom entity based upon a positive determination, wherein the phantom entity is a replication of a primary entity and performance of the action occurs while or substantially while the primary entity engages a principal process; and a transfer component configured to use a result of the action performed upon the phantom entity upon the primary entity.

2. The system of claim 1, wherein the phantom entity is a phantom controller and the primary entity is a primary controller.

3. The system of claim 1, further comprising a monitor component configured to determine when or substantially when the transfer component is to operate.

4. The system of claim 3, wherein the monitor component is configured to determine when or substantially when the transfer component is to operate based upon completion of the principal process.

5. The system of claim 1, further comprising an analysis component configured to evaluate at least a portion of the industrial control configuration to yield an evaluation result, wherein the evaluation result is used by the resolution component to determine that the phantom entity is to be used for the supplemental process.

6. The system of claim 1, wherein the action is physical movement of an object.

7. A method for using a phantom state machine in an industrial control configuration, comprising:

determining that a phantom entity is to be used for a supplemental process;

performing an action for the supplemental process upon the phantom entity, wherein the phantom entity is a replication of a primary entity and performance of the action occurs while or substantially while the primary entity engages a principal process; and using a result of the action performed upon the phantom entity upon the primary entity.

8. The method of claim 7, wherein the performing the action comprises performing the action on a phantom controller.

9. The method of claim 7, further comprising determining when or substantially when the result of the action performed by the phantom entity is to be used upon the primary entity.

10. The method of claim 9, wherein the determining when or substantially when comprises determining based upon completion of the principal process.

11. The method of claim 7, further comprising evaluating at least a portion of the industrial control configuration to yield an evaluation result used by the determining to determine if the phantom entity is to be used for the supplemental process.

12. The method of claim 7, wherein the performing the action comprises performing a physical movement of an object.

13. A non-transitory computer-readable medium having stored thereon computer-executable instructions that, in response to execution by a computer, direct the computer to:

determine that a phantom entity is to be used for a supplemental process;

in response to the phantom entity being used for the supplemental process, perform an action for the supplemental process upon the phantom entity, wherein the phantom entity is a replication of a primary entity and performance of the action occurs while or substantially while the primary entity engages a principal process; and apply a result of the action performed upon the phantom entity to the primary entity.

14. The computer-readable medium of claim 13, wherein the computer-executable instructions further direct the computer to perform the action on a phantom controller.

15. The computer-readable medium of claim 13, wherein the computer-executable instructions further direct the computer to determine when or substantially when the result of the action performed by the phantom entity is to be applied to the primary entity.

16. The computer-readable medium of claim 15, wherein the computer-executable instructions further direct the computer to determine when or substantially when the result of the action performed by the phantom entity is to be applied to the primary entity based upon completion of the principal process.

17. The computer-readable medium of claim 13, wherein the computer-executable instructions further direct the computer to evaluate at least a portion of an industrial control configuration to yield an evaluation result used to determine that the phantom entity is to be used for the supplemental process.

18. The computer-readable medium of claim 13, wherein the computer-executable instructions further direct the computer to perform the action for the supplemental process as a physical movement of an object.

* * * * *